(12) United States Patent
Kim et al.

(10) Patent No.: US 9,743,106 B2
(45) Date of Patent: Aug. 22, 2017

(54) APPARATUS FOR VIDEO PROCESSING AND METHOD FOR THE SAME

(71) Applicant: Electronics and Telecommunications Research Institute, Daejeon (KR)

(72) Inventors: Nac Woo Kim, Gwanju (KR); Chie Teuk Ahn, Seoul (KR); Byung Tak Lee, Gyeonggi-do (KR); Young Sun Kim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 246 days.

(21) Appl. No.: 14/470,391

(22) Filed: Aug. 27, 2014

(65) Prior Publication Data

US 2015/0063450 A1    Mar. 5, 2015

(30) Foreign Application Priority Data

Sep. 5, 2013    (KR) .................. 10-2013-0106495

(51) Int. Cl.
*H04N 19/00*        (2014.01)
*H04N 19/54*        (2014.01)
*H04N 19/597*       (2014.01)
*H04N 19/85*        (2014.01)

(52) U.S. Cl.
CPC .......... *H04N 19/54* (2014.11); *H04N 19/597* (2014.11); *H04N 19/85* (2014.11)

(58) Field of Classification Search
CPC .... H04N 5/225; H04N 19/597; H04N 19/105; H04N 19/176; H04N 19/46; H04N 19/615; H04N 19/63; H04N 19/61; H04N 19/103; H04N 19/13; H04N 7/18; G06K 9/40; G06K 9/48; G06K 9/00; G06T 7/0083; G06T 11/60; G06T 2207/20092; G06T 2207/20144; A61B 5/00
See application file for complete search history.

(56) References Cited

U.S. PATENT DOCUMENTS

| 6,343,141 | B1 * | 1/2002 | Okada ................ G06K 9/00268 348/587 |
| 8,290,257 | B2 * | 10/2012 | Demirli .................. A61B 5/441 382/128 |
| 2006/0146143 | A1 * | 7/2006 | Xin ....................... H04N 19/597 348/218.1 |
| 2007/0147700 | A1 * | 6/2007 | Jeong .................... G06T 7/0083 382/266 |

(Continued)

FOREIGN PATENT DOCUMENTS

| KR | 10-2004-0022835 | 3/2004 |
| KR | 10-2010-0122999 | 11/2010 |

*Primary Examiner* — Frank Huang
(74) *Attorney, Agent, or Firm* — Nelson Mullins Riley & Scarborough LLP

(57) ABSTRACT

Disclosed are an apparatus, a method, and a system for compressing and transmitting video. The video processing apparatus comprises an overlap area extraction part being provided with at least one input video which is acquired by at least one video acquisition device and real space video data stored in a data base, and extracting overlap areas by matching the input video with the real space video data; and a video compression part compressing, based on the overlap areas, the at least one input video by using at least one reference frame based on information included in the real space video data.

9 Claims, 6 Drawing Sheets

(56) References Cited

U.S. PATENT DOCUMENTS

| | | | |
|---|---|---|---|
| 2009/0080715 A1* | 3/2009 | van Beek | A61B 5/0059 |
| | | | 382/118 |
| 2009/0163185 A1 | 6/2009 | Lim et al. | |
| 2010/0033484 A1* | 2/2010 | Kim | G06T 19/006 |
| | | | 345/426 |
| 2013/0194392 A1* | 8/2013 | Qi | H04N 13/0207 |
| | | | 348/50 |

* cited by examiner

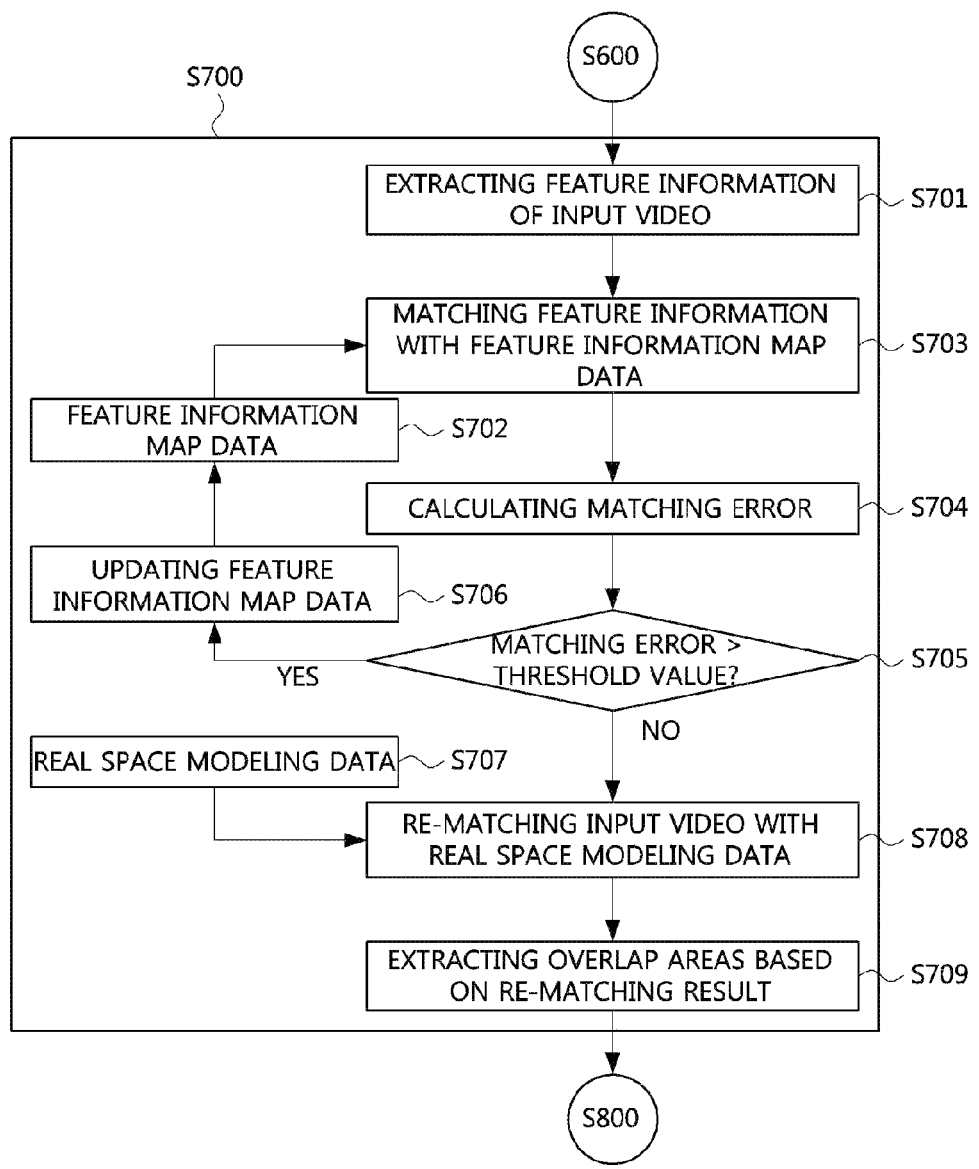

APPARATUS FOR VIDEO PROCESSING AND METHOD FOR THE SAME

CLAIM FOR PRIORITY

This application claims priority to and the benefit of Korean Patent Application No. 10-2013-0106495 filed on Sep. 5, 2013 in the Korean Intellectual Property Office (KIPO), the entire contents of which is hereby incorporated by reference.

BACKGROUND

1. Technical Field

Example embodiments of the present invention relate to a video processing technique, and more specifically to an apparatus and a method for compressing and transmitting a multi-viewpoint video based on overlap areas.

2. Related Art

A video processing apparatus is an apparatus for compressing and transmitting video which can be provided with video from a plurality of cameras, compress the video, and provide a user terminal with the compressed video. Especially, such the video processing apparatus is usually being used for video monitoring systems.

The video monitoring systems may be provided with video streams by a plurality of camera devices each of which is located in an arbitrary position, compress each video stream, and perform streaming of each compressed video stream through networks.

However, such the method may generate a great amount of traffics in the video monitoring system due to rapidly-increasing number of closed circuit television (CCTV). Also, if full high-definition (FHD) CCTVs are widely distributed and an integrated video monitoring system for each district is used, even more traffic can be generated in the video monitoring systems.

On the other hand, as an another method, a multi-view video coding (MVC) based on a moving picture experts group (MPEG) standard can be used. The MVC can be used for compressing and transmitting videos provided from a plurality of camera devices arranged in one-dimensional form or two-dimensional form. That is, the MVC can compress multiple videos and interpolate intermediate videos for the multiple videos based on multi-viewpoints by using predetermined positions, geometry information, and parameters of the plurality of camera devices.

However, since videos acquired by a plurality of camera devices from arbitrary viewpoints may not have spatially correlated relationship, they have no predictable structures, and accordingly it is difficult for the MVC to be used for the videos acquired from arbitrary multiple viewpoints.

SUMMARY

Accordingly, example embodiments of the present invention are provided to substantially obviate one or more problems due to limitations and disadvantages of the related art.

Example embodiments of the present invention provide an apparatus for compressing and transmitting multi-viewpoint videos based on overlap areas.

Example embodiments of the present invention also provide a method for compressing and transmitting multi-viewpoint videos based on overlap areas.

In some example embodiments, a video processing apparatus may comprise an overlap area extraction part being provided with at least one input video which is acquired by at least one video acquisition device and real space video data stored in a data base, and extracting overlap areas by matching the input video with the real space video data; and a video compression part compressing, based on the overlap areas, the at least one input video by using at least one reference frame based on information included in the real space video data.

Here, the video compression part may compress a differential video generated by subtracting the at least one reference frame including the overlap areas from the at least one input video.

Here, the video compression part may generate at least one predictive frame by performing a time-space predictive coding based on the at least one reference frame including the overlap areas, and compress a residual video generated by subtracting the at least one predictive frame from the at least one input video.

Here, each of the at least one input video and the real space video data may be a video acquired by using different viewpoint.

Here, the real space video data may include real space modeling data and feature information map data generated through a pre-processing on at least one real space video acquired beforehand. Also, the overlap area extraction part may comprise a feature information extraction part extracting feature information of the at least one input video; a matching part performing a matching between the feature information of the at least one input video and the feature information map data and outputting a matching result; a matching error calculation part calculating a matching error based on the matching result; and a comparison part comparing the matching error with a threshold value and extracting the overlap areas according to the comparison result.

Also, the comparison part may comprise a matching error comparison sub-unit comparing the matching error with the threshold value and outputting the comparison result; and an overlap area extraction sub-unit configured to update the feature information map data based on the feature information of the at least one input video and provide the updated feature information map data to the matching part when the matching error exceeds the threshold value, and to perform a re-matching between the real space modeling data and the at least one input video and extract the overlap areas based on a result of the re-matching when the matching error does not exceed the threshold value.

In other example embodiments, a video processing method may comprise extracting overlap areas by matching at least input video and real space video data stored in a data base; and compressing, based on the overlap areas, the at least one input video by using at least one reference frame based on information included in the real space video data.

Here, in the compressing the at least one input video, a differential video generated by subtracting the at least one reference frame including the overlap areas from the at least one input video may be compressed.

Here, in the compressing the at least one input video, at least one predictive frame may be generated by performing a time-space predictive coding based on the at least one reference frame including the overlap areas, and a residual video generated by subtracting the at least one predictive frame form the at least one input video may be compressed.

Here, each of the at least one input video and the real space video data may be a video acquired by using different viewpoint.

Here, the real space video data may include real space modeling data and feature information map data generated through a pre-processing on at least one real space video acquired beforehand. Also, the extracting the overlap areas may comprise extracting feature information of the at least one input video; performing a matching between the feature information of the at least one input video and the feature information map data and outputting a matching result; calculating a matching error based on the matching result; and comparing the matching error with a threshold value and extracting the overlap areas according to the comparison result. Also, the comparing the matching error with the threshold value and extracting the overlap areas according to the comparison result may comprise comparing the matching error with the threshold value and outputting the comparison result; when the matching error exceeds the threshold value, updating the feature information map data based on the feature information of the at least one input video, wherein the updated feature information map data is used for a re-matching with the feature information of the input video; and when the matching error does not exceed the threshold value, performing a re-matching between the real space modeling data and the at least one input video and extracting the overlap areas based on a result of the re-matching.

Here, the method may further comprise, prior to the extracting the overlap areas, generating and storing the real space video data through a pre-processing on at least one pre-acquired real space video.

According to the present invention, the differential video may be minimized so that efficiency of video compression can be increased and accordingly use of network bandwidth may be significantly reduced.

Also, perspective deformation of the real space modeling data can be simultaneously processed even when the video acquisition device located at arbitrary position moves so that differential video can be minimized and amount of transmission data can be reduced.

Furthermore, since the video processing apparatus according to the present invention can use the pre-processed real space video data, the video apparatus may omit the above-described procedures while compressing and transmitting the input video whereby the video processing can be performed more rapidly. Thus, the video processing apparatus and method according to the present invention may be applied to a video searching system, a traffic monitoring system, and a security monitoring system as well as a video monitoring system.

BRIEF DESCRIPTION OF DRAWINGS

Example embodiments of the present invention will become more apparent by describing in detail example embodiments of the present invention with reference to the accompanying drawings, in which:

FIG. 8 is a flow chart illustrating a procedure of extracting overlap areas in the method according to an example embodiment of the present invention.

DESCRIPTION OF EXAMPLE EMBODIMENTS

Figure 1:
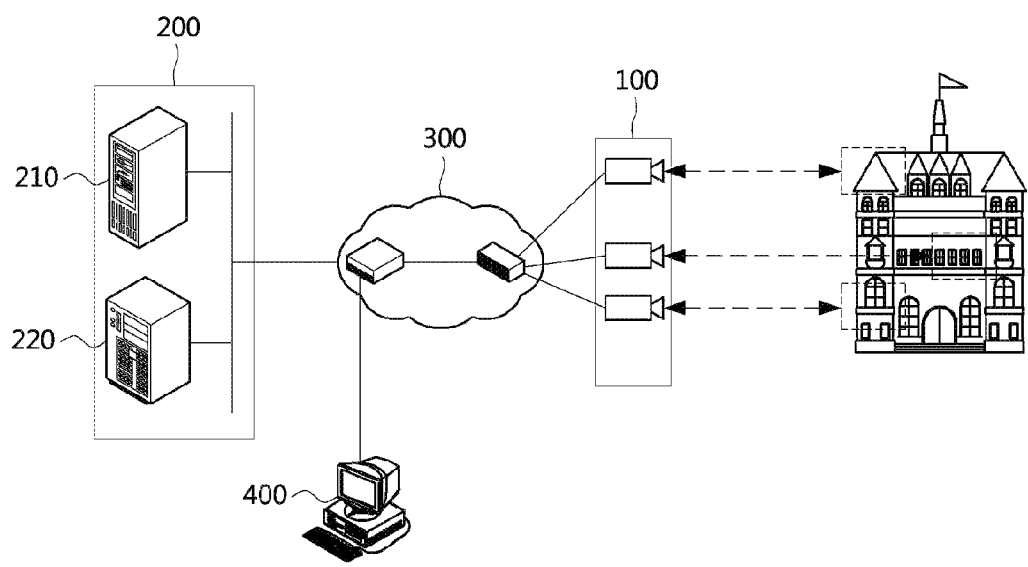
FIG. 1 is a conceptual diagram illustrating a video processing system according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a video processing apparatus and a video processing method according to the present invention will be explained by referring to accompanying figures.

FIG. 1 is a conceptual diagram illustrating a video processing system according to an example embodiment of the present invention.

Referring to FIG. 1, the video processing system according to an example embodiment of the present invention may comprise at least one video acquisition device 100, a remote server 200, and a video processing apparatus 300.

The video acquisition device 100 may be located in an arbitrary position of a real space, and comprise at least one camera device. Also, the video acquisition device 100 may acquire videos for the real space, and provide the video processing apparatus 300 or the remote sever 200 with the acquired videos (i.e. at least one input video). Here, the at least one input video may be at least one video acquired by a plurality of video acquisition devices from arbitrary viewpoints. Also, the at least one input video may be provided in real time manner.

Also, the at least one video acquisition device 100 may directly provide the at least one input video to the video processing apparatus 300, or provide the at least one input video to the remote server 200 or a user terminal 400 without passing through the video processing apparatus 300.

Also, the at least one video acquisition device 100 generally includes at least one camera device. However, in the present invention, without restricting the video acquisition device, the video acquisition device 100 may use any kind of devices which can acquire and provide the input videos.

Specifically, each of the at least one video acquisition device 100 may comprise at least one of an internet protocol (IP) camera, a CCTV, an omnidirectional camera, a laser scanner, a portable terminal, a pan-tilt-zoom (PTZ) camera, an infra-red camera, and a thermal sensor. Especially, the portable terminal may be a terminal comprising at least one camera, which can acquire videos and transmit the acquired videos to a server or another terminal, such as a Personal Digital Assistant (PDA) and a smart phone.

The remote server 200 may store real space video data in advance. That is, the real space video data stored in the remote server 200 may be video data which have already been acquired from the at least one video acquisition device 100 and pre-processed.

Also, the remote server 200 may comprise a management server 210 and a database (DB) server 220. The management server 210 may be provided with videos for real spaces from the video acquisition device 100, perform pre-processing on the provided videos for real spaces and generate the real space video data. The database server 220 may store the real space video data generated and provided by the management server 210.

The real space video data will be explained in detail by referring to FIGS. 2 and 3.

The video processing apparatus 300 may be provided with the at least one input video from the at least one video acquisition device 100, and be provided with the real space video data from the remote server 200. Also, the video processing apparatus 300 may extract overlap areas by matching the input video with the real space video data. Also, the video processing apparatus 300 may compress the at least one input video by using the extracted overlap areas, and transmit the compressed input video to the user terminal 400 as multiplexed.

As an example, the video processing apparatus 300 may compress a differential video generated by subtracting the real space video data including the overlap areas from the input video.

As another example, the video processing apparatus 300 may generate a predictive frame by performing a time-space predictive coding based on the real space video data including the overlap areas, and compress a residual video generated by subtracting the predictive frame from the input video.

Also, the video processing apparatus 300 may be connected with the at least one video acquisition device 100, the remote server 200, and the user terminal 400. Thus, the video processing apparatus 300 may comprise an interface part which performs interfacing with the at least one video acquisition device 100, the remote server 200, and the user terminal 400. Here, the interface part may comprise a sync node and a gateway.

Also, the video processing apparatus 300 will be explained in detail by referring to FIGS. 2 and 3.

In the video processing system according to an example embodiment of the present invention, the at least one video acquisition device 100, the remote server 200, and the video processing apparatus 300 may comprise a communication part (not illustrated) performing wired or wireless communications with each other. The communication part may be configured as a communication module.

Also, although an example in which the pre-processing is performed in the remote server 200 is described, it is not restricted to the above example. That is, the pre-processing may be performed also in the at least one video acquisition device 100 or the video processing apparatus 300 as well as in the management server 210 of the remote server 200. Thus, the video acquisition device 100 and the video processing apparatus 300 may include a pre-processing part which can perform the pre-processing.

Also, although an example in which the real space video data is stored in the data base server 220 of the remote server 200 is described, it is not restricted to the above example. That is, the real space video data may be stored also in the at least one video acquisition device 100 or the video processing apparatus 300 as well as in the data base server 220 of the remote server 200. Thus, the video acquisition device 100 and the video processing apparatus 300 may include a data base which can store the real space video data.

In the above descriptions, a configuration of the video processing system according to an example embodiment was explained. Hereinafter, the video processing apparatus according to an example embodiment of the present invention will be explained by referring to accompanying figures. Especially, for simplicity of explanations, explanations on already-explained parts of the video processing system will be omitted.

Figure 2:
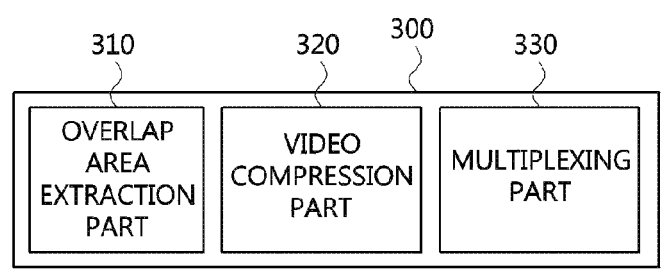
FIG. 2 is a block diagram illustrating a video processing apparatus according to an example embodiment of the present invention.

FIG. 2 is a block diagram illustrating a video processing apparatus according to an example embodiment of the present invention.

Referring to FIG. 2, the video processing apparatus according to an example embodiment of the present invention may comprise an overlap area extraction part 310 and the video compression part 320. Also, the apparatus may further comprise a multiplexing part 330.

The overlap area extraction part 310 may be provided with the at least one input video acquired from the at least one video acquisition device 100 and the real space video data stored in the data base, and extract the overlap areas by matching the at least one input video with the real space video data.

Here, each of the at least one input video and the real space video data is a video acquired by using a different viewpoint.

Furthermore, the real space video data may be generated by pre-processing videos for real spaces which are acquired from the at least one video acquisition device 100 in advance. Also, the real space video data may include real space modeling data and feature information map data.

The real space modeling data may include 2.5-dimensional real space modeling data and/or 3-dimensional real space modeling data. However, the contents of the real space modeling data are not restricted to the above two examples.

The feature information map data may include at least one of position information, shooting information, main axis information, main feature information, time information, weather information, environment information, and illumination intensity information. However, the contents of the feature information map data are not restricted to the above examples.

Figure 4:
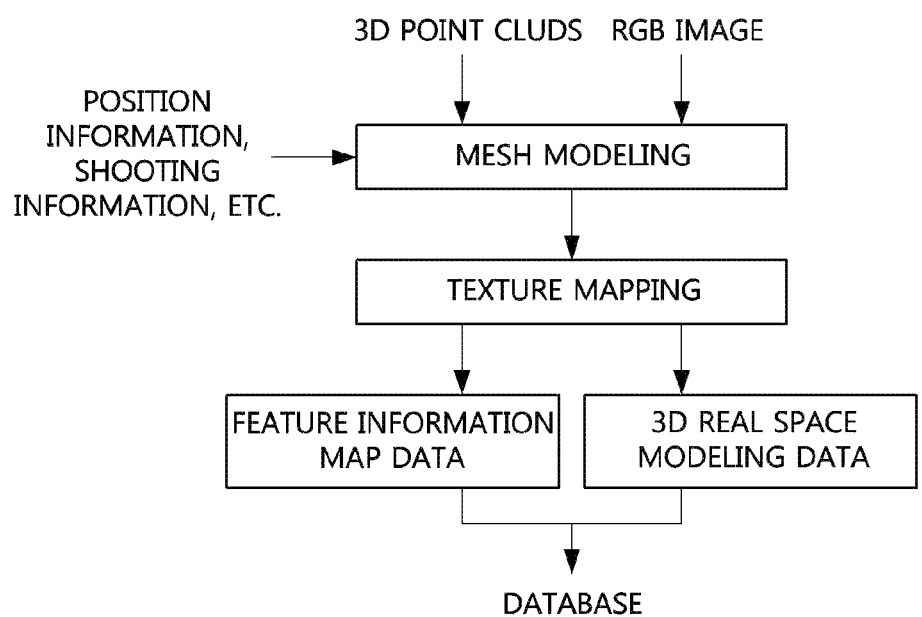
FIG. 4 is a flow chart illustrating a procedure of constructing real space video data for videos based on laser scanner and camera according to an example embodiment of the present invention.
Figure 5:
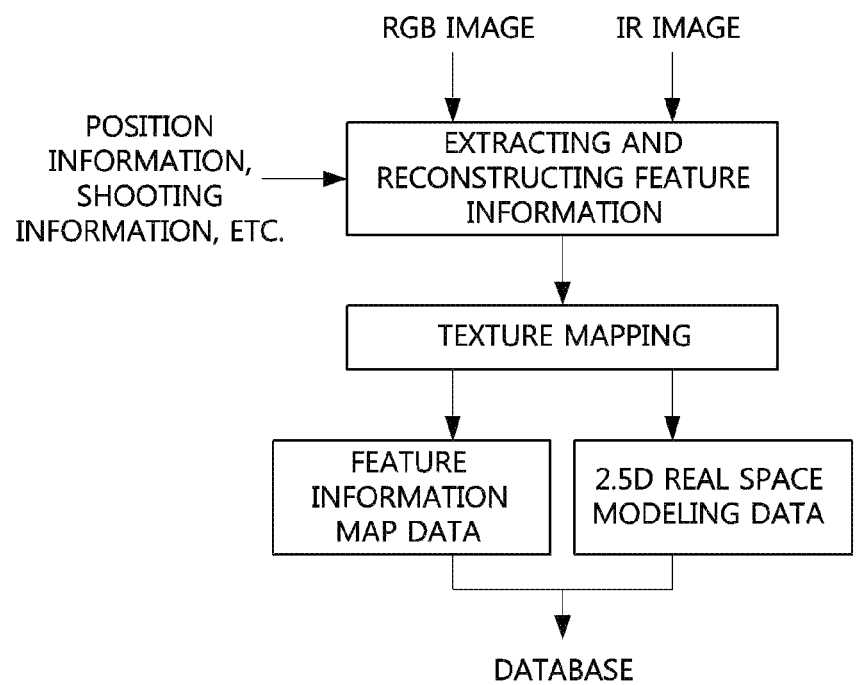
FIG. 5 is a flow chart illustrating a procedure of constructing real space video data for videos based on infrared (IR) and camera according to an example embodiment of the present invention.

Also, the real space video data may be constructed differently according to the at least one input video provided by the at least one video acquisition device 100, and stored in the data base beforehand. A procedure in which the real space video data is constructed differently according to the at least one input video may be explained by referring to FIGS. 4 and 5. In FIGS. 4 and 5, a part constructing the real space video data may be referred to as a pre-processing part.

FIG. 4 is a flow chart illustrating a procedure of constructing real space video data for videos based on laser scanner and camera according to an example embodiment of the present invention.

Referring to FIG. 4, the pre-processing part may be provided with video data such as a plurality of 3-dimensional clouds, red-green-blue (RGB) videos, position information, shooting information, etc.

Then, the pre-processing part may perform mesh modeling on the provided video data. Then, the pre-processing part may perform texture-mapping on the video data on which the mesh modeling is performed so as to generate the real space video data. Here, the generated real space video data may include the 3-dimensional real space modeling data and the feature information map data. Then, the pre-processing part may provide the data base with the generated real space video data.

FIG. 5 is a flow chart illustrating a procedure of constructing real space video data for videos based on infrared (IR) and camera according to an example embodiment of the present invention.

Referring to FIG. 5, the pre-processing part may be provided with video data such as a plurality of IR videos, RGB videos, position information, shooting information, etc. That is, the pre-processing part may be provided with depth values and textures for a target real space through IR pattern illumination and video shooting.

Then, the pre-processing part may perform extraction and reconstruction of feature information for the provided video data. Then, the pre-processing part may perform texture mapping on the video data on which the feature information extraction and reconstruction are performed so as to generate the real space video data. The generated real space video data may include the 2.5-dimensional real space modeling data and the feature information map data. Then, the pre-processing part may provide the data base with the generated real space video data.

Accordingly, since the video processing apparatus according to the present invention may use the pre-processed real space video data for real space video, the video processing apparatus may omit the above described procedures while compressing and transmitting the input videos whereby the video processing can be performed more rapidly.

Figure 3:
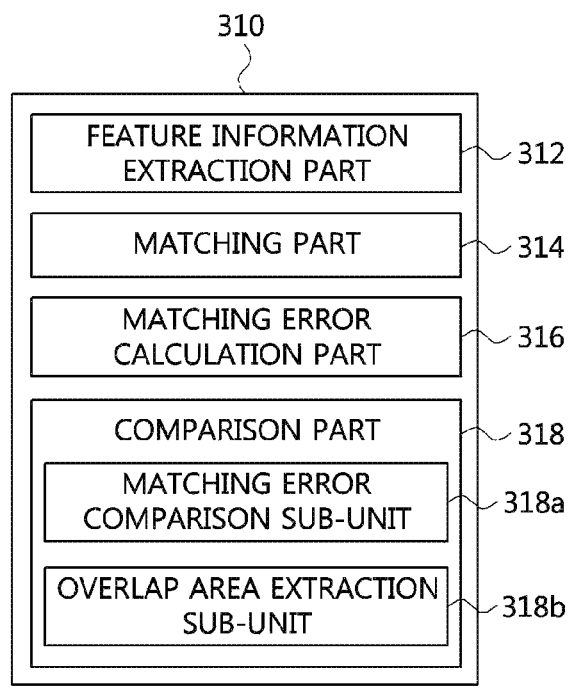
FIG. 3 is a block diagram illustrating an overlap area extraction part according to an example embodiment of the present invention.

FIG. 3 is a block diagram illustrating an overlap area extraction part according to an example embodiment of the present invention.

Referring to FIGS. 2 and 3, the overlap area extraction part 310 may comprise feature information extraction part 312, a matching part 314, a matching error calculation part 316, and a comparison part 318.

The feature information extraction part 312 may be provided with the at least one input video from the at least one video acquisition device 100. Also, the feature information extraction part 312 may extract feature information from the provided at least one input video.

The matching part 314 may be provided with the feature information of the input videos from the feature information extraction part 312, and provided with the feature information map data from the data base. Also, the matching part 314 may perform a matching between the feature information of the input videos with the feature information map data so as to output a matching result. Specifically, the matching part 314 may perform the matching between the feature information of the input videos with the feature information map data coarsely.

The matching error calculation part 316 may be provided with the matching result from the matching part 314. Also, the matching error calculation part 316 may calculate the matching error according to the matching result provided from the matching part 314.

The comparison part 318 may be provided with the matching error from the matching error calculation part 316. Also, the comparison part 318 may compare the provided matching error with a preconfigured threshold value. Also, the comparison part 318 may extract the overlap areas according to a result of the comparison between the provided matching error and the preconfigured threshold value. Here, the comparison part 318 may comprise a matching error comparison sub-unit 318*a* and an overlap area extraction sub-unit 318*b*.

The matching error comparison sub-unit 318 may be provided with the matching error from the matching error calculation part 316. Also, the matching error comparison sub-unit 318 may output a comparison result by comparing the provided matching error with the preconfigured threshold value.

The overlap area extraction sub-unit 318*b* may be provided with the comparison result from the matching error comparison sub-unit 318*a*. Also, the overlap area extraction sub-unit 318*b* may extract the overlap areas according to the comparison result.

That is, when the matching error exceeds the preconfigured threshold value, the overlap area extraction sub-unit 318*b* may update the feature information map data stored in the data base based on the feature information of the input video which is extracted by the feature information extraction part 312. Also, the overlap area extraction sub-unit 318*b* may again provide the updated feature information map data to the matching part 314 for matching with the feature information of the input video.

Also, when the matching error is equal to or less than the threshold value, the overlap area extraction sub-unit 318*b* may perform a re-matching between the real space modeling data stored in the data base and the input video. Specifically, the overlap area extraction sub-unit 318*b* may perform the re-matching between the real space modeling data and the input video finely. Also, the overlap area extraction sub-unit 318*b* may extract the overlap areas according to a result of the re-matching between the real space modeling data and the input video.

Thus, the video processing apparatus according to the present invention may perform the coarse matching between the input video and the pre-stored feature information map data, and perform the fine re-matching between the real space modeling data and the input video thereby minimizing differential video and increasing video compression efficiency. Accordingly, use of network bandwidth may be reduced significantly.

Re-referring to FIG. 2, the video compression part 320 may be provided with the extracted overlap areas from the overlap area extraction part 310. Also, the video compression part 320 may compress the input video based on the overlap areas by using reference frames based on information included in the real space video data.

As described above, the information included in the real space video data may comprise the real space modeling data and the feature information map data. Thus, the reference frames may be based on the real space modeling data. Also, the real space video data may be video data acquired beforehand by using different viewpoints.

Also, the video compression part 320 may compress the differential video generated by subtracting the reference frame including the overlap areas from the input video. That is, the video compression part 320 may compress the differential video generated by removing the areas overlapping with the reference frame from the input video.

Also, the video compression part 320 may generate a predictive frame by performing time-space predictive coding using the reference frame comprising the overlap areas, and compress a residual video generated by subtracting the predictive frame from the input video.

Especially, the video processing apparatus according to the present invention may compress input video acquired from various viewpoints as time elapses. That is, the video processing apparatus may compress the multi viewpoint video acquired from arbitrary viewpoints.

Figure 6:
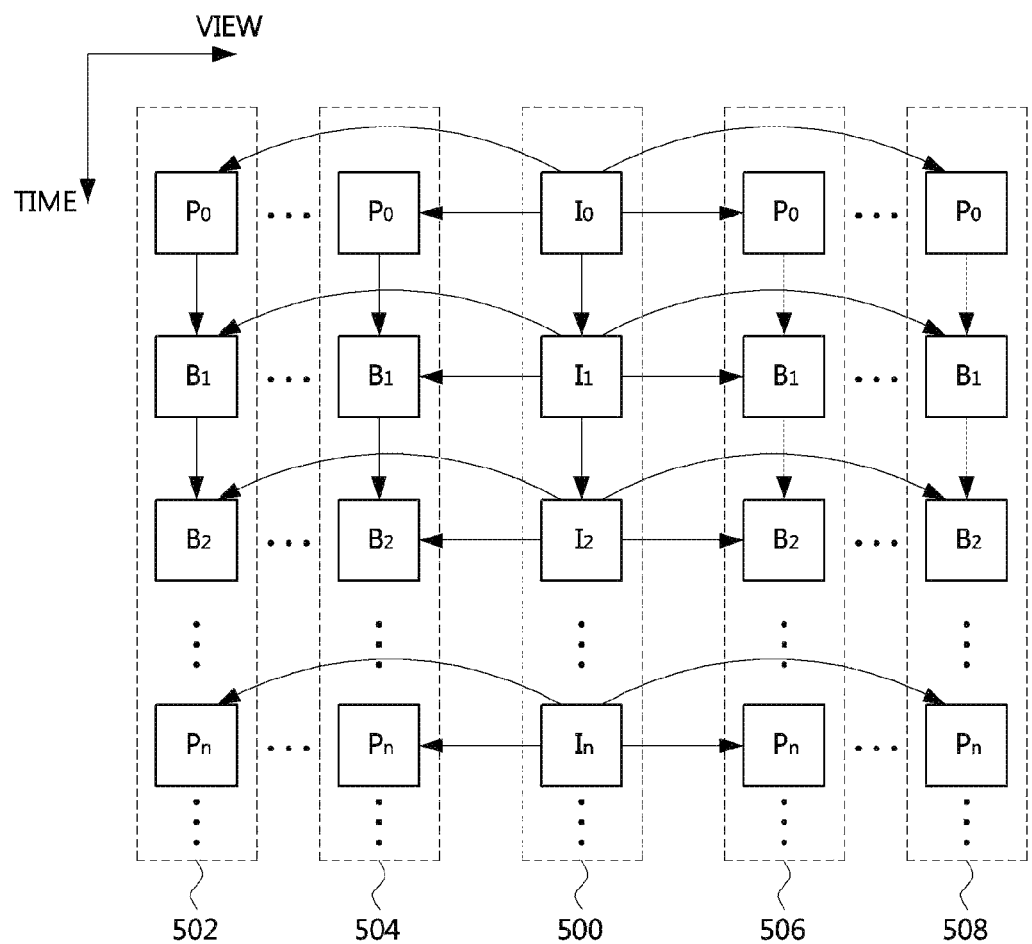
FIG. 6 is a conceptual diagram illustrating a time-space predictive coding between real space modeling data and input video acquired from arbitrary viewpoints according to an example embodiment of the present invention.

FIG. 6 is a conceptual diagram illustrating a time-space predictive coding between real space modeling data and input video acquired from arbitrary viewpoints according to an example embodiment of the present invention.

Referring to FIG. 6, the real space modeling data pre-stored in the data base may be reference frames 500. Also, the multi-viewpoint input video acquired by a plurality of video acquisition device 100 from arbitrary viewpoints may be referencing frames 502, 504, 506, and 508.

Here, the reference frames 500 may be videos from a basic viewpoint. Also, $P_0, \ldots,$ and $P_n$ among the referencing frames 502, 504, 506, and 508 may be frames on which unidirectional inter-viewpoint prediction is performed. Also, $B_1, \ldots,$ and $B_n$ among the referencing frames 502, 504, 506, and 508 may be frames on which bidirectional inter-viewpoint prediction is performed.

That is, the real space modeling data is utilized as the reference frames 500 for compression of the multi-viewpoint input video, and the multi-viewpoint input video may be structurized by using the referencing frames 502, 504, 506, and 508 which are predicted from the reference frames 500. Especially, the time-space predictive coding may be performed by referring to frames from different viewpoints.

As an example, if illumination intensity change or weather change according to time lapse does not occur (i.e. the multi-viewpoint input video is fixed), as explained in FIG. 4, the matching error may become equal to or less than the preconfigured threshold value. Accordingly, the reference frame 500*s* may become the same video frames.

As another example, if illumination intensity change or weather change according to time lapse does occur (i.e. the multi-viewpoint input video is variable), as explained in FIG. 4, the matching error may exceed the preconfigured threshold value. Accordingly, the reference frames 500 may become different video frames according to the feature information map data.

Re-referring to FIG. 2, the multiplexing part 330 may be provided with compressed video generated by compressing the input video from the video compression part 320. Also, the multiplexing part 330 may multiplex the provided input video and provide an output video which is a multiplexed and compressed video.

Therefore, the video processing apparatus according to the present invention may perform the time-space predictive coding between the input video acquired from arbitrary viewpoints and pre-stored real space modeling data, and accordingly perspective deformation of the real space modeling data may be simultaneously processed even when the video acquisition device located at arbitrary position moves, so that differential video can be minimized and amount of transmission data can be reduced.

Also, the video processing apparatus according to the present invention may include various video acquisition devices such as an IP camera, a CCTV, an omnidirectional camera, a laser scanner, a portable terminal, a pan-tilt-zoom (PTZ) camera, an infra-red camera, and a thermal sensor. Thus, the video processing apparatus may be applied to a video searching system, a traffic monitoring system, and a security monitoring system as well as the video monitoring system.

In the above descriptions, each configuration of the video processing apparatus according to the present invention was explained. Hereinafter, a method for video processing according to an example embodiment of the present invention will be explained. Especially, for simplicity of explanation, redundant explanations will be omitted.

Figure 7:
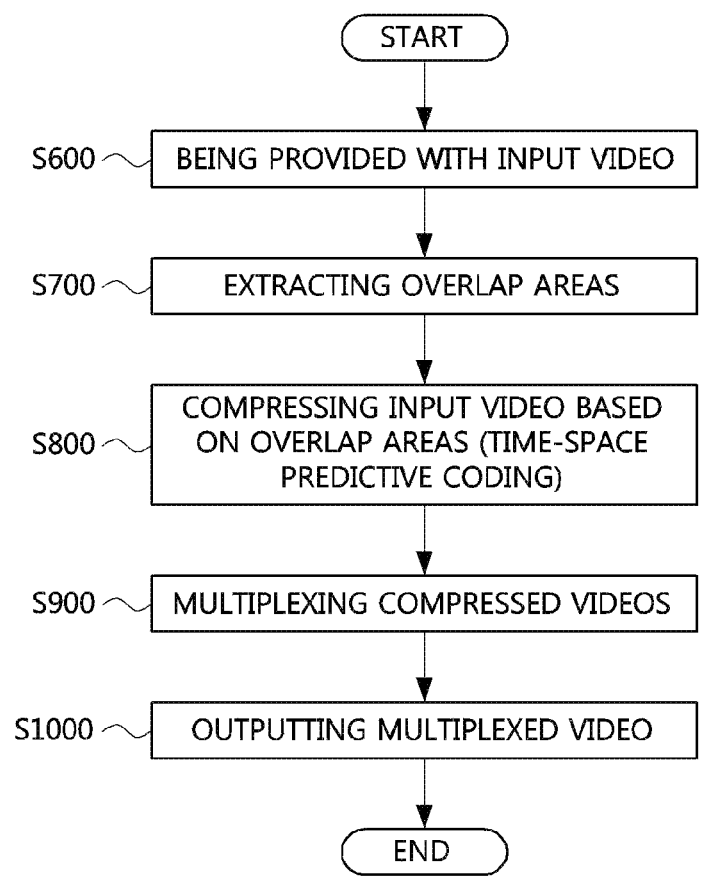
FIG. 7 is a flow chart illustrating a video procession method according to an example embodiment of the present invention.

FIG. 7 is a flow chart illustrating a video procession method according to an example embodiment of the present invention.

Referring to FIG. 7, the video processing method according to an example embodiment of the present invention may comprise a step S700 of extracting overlap areas by matching input image and real space video data which is stored in advance; and a step S800 of compressing the input video by using a reference frame based on information included in the real space video on a basis of the overlap areas.

In the step S600, an input video which is a video of a real space may be provided. Here, the input video may be a multi-viewpoint video acquired from different viewpoints according to time lapse.

Then, overlap areas may be extracted by matching the input video with the real space video data which is stored beforehand (S700).

In this step, the real space video data may be video data generated through the above-described pre-processing on the real space video acquired beforehand. Therefore, the real space video data may be generated and stored before the steps S600 and S700.

Also, the real space video data may include real space modeling data and feature information map data. Also, the real space video data may be video data acquired beforehand by using different viewpoints.

Also, since the detail of the real space video data was already explained, redundant explanations will be omitted for simplicity of explanation.

FIG. 8 is a flow chart illustrating a procedure of extracting overlap areas in the method according to an example embodiment of the present invention.

Referring to FIG. 8, feature information of the provided input video may be extracted (S701). Then, the pre-stored feature information map data will be provided (S702). Then, a matching result will be output by perform matching between the extracted feature information of the input video and the feature information map data (S703). Specifically, the matching between the extracted feature information of the input video and the feature information map data may be performed coarsely. Then, a matching error may be calculated according to the matching result (S704). Then, the matching error is compared with a preconfigured threshold value, and the overlap areas may be extracted according to the comparison result.

That is, the comparison result may be determined by comparing the matching error with the preconfigured threshold value (S705).

Here, if the matching error exceed the preconfigured threshold value, the feature information map data may be updated based on the feature information of the input video (S706). Then, matching between the updated feature information map data and the feature information of the input video may be performed (S703).

Here, if the matching error does not exceed the preconfigured threshold value, re-matching between the real space modeling data and the input video may be performed (S608). Then, the overlap areas may be extracted based on a result of the re-matching (S709). Specifically, the re-matching between the real space modeling data and the input video may be performed finely.

Re-referring to FIG. 7, after the step S700, the input video may be compressed by using reference frames based on information included in the real space video data on the basis of the overlap areas (S800).

Here, as described in the explanation on the video compression part 320 of the video processing apparatus, the reference frame may be based on the real space modeling data.

Here, in the step S800, a differential video may be generated by subtracting the reference frame including the overlap areas from the input video and compressed. That is, in the step S800, the differential video generated by removing areas overlapped with the reference frames from the input video may be compressed.

Here, in the step S800, a predictive frame may be generated by performing time-space predictive coding using the reference frames including the overlap areas, and a residual video generated by subtracting the predictive frame from the input video may be compressed. Also, redundant explanations on the time-space predictive coding are omitted for simplicity of explanation.

Then, the compressed input video may be multiplexed (S900), and the output video which is the multiplexed and compressed video may be provided (S1000).

While the example embodiments of the present invention and their advantages have been described in detail, it should be understood that various changes, substitutions and alterations may be made herein without departing from the scope of the invention.

What is claimed is:

1. A video processing apparatus comprising:
an overlap area extraction part being provided with at least one input video which is acquired by at least one video acquisition device and real space video data stored in a data base, and extracting overlap areas by matching the input video with the real space video data, wherein the real space video data includes real space modeling data and feature information map data generated through pre-processing on at least one real space video acquired beforehand; and
a video compression part compressing, based on the overlap areas, the at least one input video by using at least one reference frame based on information included in the real space video data,
wherein the overlap area extraction part comprises:
a feature information extraction part extracting feature information of the at least one input video;
a matching part performing a matching between the feature information of the at least one input video and the feature information map data and outputting a matching result;
a matching error calculation part calculating a matching error based on the matching result; and
a comparison part comparing the matching error with a threshold value and extracting the overlap areas according to the comparison result, and
wherein the comparison part comprises:
a matching error comparison sub-unit comparing the matching error with the threshold value and outputting the comparison result; and
an overlap area extraction sub-unit configured to update the feature information map data based on the feature information of the at least one input video and provide the updated feature information map data to the matching part when the matching error exceeds the threshold value, and to perform a re-matching between the real space modeling data and the at least one input video and extract the overlap areas based on a result of the re-matching when the matching error does not exceed the threshold value.

2. The video processing apparatus of the claim 1, wherein the video compression part compresses a differential video generated by subtracting the at least one reference frame including the overlap areas from the at least one input video.

3. The video processing apparatus of the claim 1, wherein the video compression part generates at least one predictive frame by performing a time-space predictive coding based on the at least one reference frame including the overlap areas, and compresses a residual video generated by subtracting the at least one predictive frame from the at least one input video.

4. The video processing apparatus of the claim 1, wherein each of the at least one input video and the real space video data is a video acquired by using different viewpoint.

5. A video processing method comprising:
extracting overlap areas by matching at least input video and real space video data stored in a data base, wherein the real space video data includes real space modeling data and feature information map data generated through pre-processing on at least one real space video acquired beforehand; and compressing, based on the overlap areas, the at least one input video by using at least one reference frame based on information included in the real space video data, wherein the extracting the overlap areas comprises:
    extracting feature information of the at least one input video;
    performing a matching between the feature information of the at least one input video and the feature information map data and outputting a matching result;
    calculating a matching error based on the matching result; and
    comparing the matching error with a threshold value and extracting the overlap areas according to the comparison result, and wherein the comparing the matching error with the threshold value and extracting the overlap areas according to the comparison result comprises:
    comparing the matching error with the threshold value and outputting the comparison result;
    when the matching error exceeds the threshold value, updating the feature information map data based on the feature information of the at least one input video, wherein the updated feature information map data is used for a re-matching with the feature information of the input video; and
    when the matching error does not exceed the threshold value, performing a re-matching between the real space modeling data and the at least one input video and extracting the overlap areas based on a result of the re-matching.

6. The video processing method of the claim 5, wherein, in the compressing the at least one input video, a differential video generated by subtracting the at least one reference frame including the overlap areas from the at least one input video is compressed.

7. The video processing method of the claim 5, wherein, in the compressing the at least one input video, at least one predictive frame is generated by performing a time-space predictive coding based on the at least one reference frame including the overlap areas, and a residual video generated by subtracting the at least one predictive frame form the at least one input video is compressed.

8. The video processing method of the claim 5, wherein each of the at least one input video and the real space video data is a video acquired by using different viewpoint.

9. The video processing method of the claim 5, further comprising, prior to the extracting the overlap areas, generating and storing the real space video data through a pre-processing on at least one pre-acquired real space video.

* * * * *